May 12, 1953

A. B. SEPPMANN 2,637,977

VALVE CONTROLLED BRAKE FLUID ACCUMULATOR
FOR MASTER CYLINDERS

Filed Oct. 14, 1947

Inventor:
Alfred B. Seppmann
By: Bair & Freeman
Attorneys.

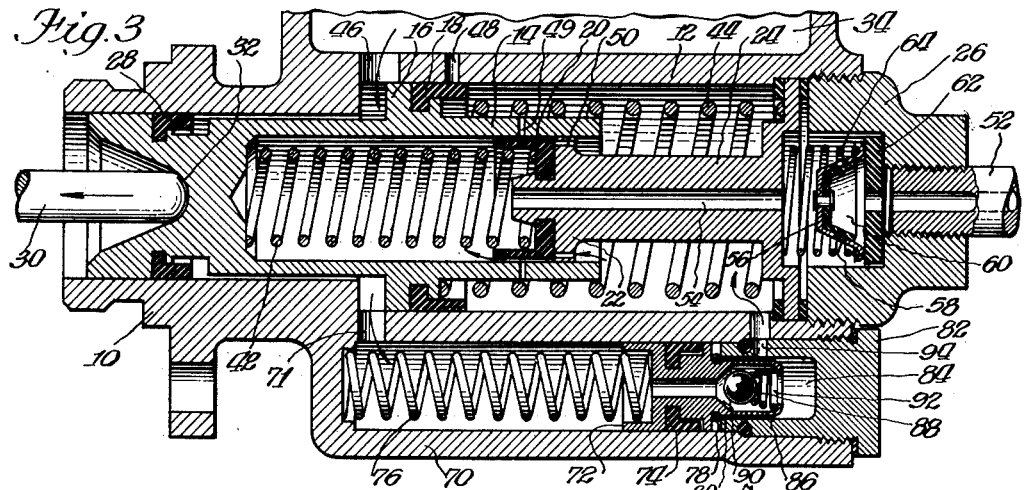
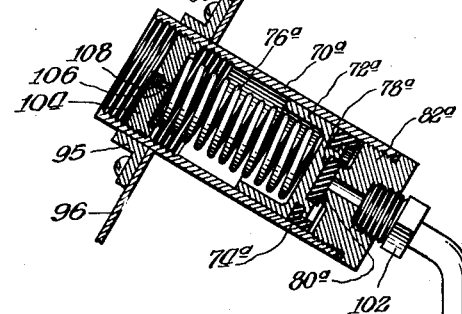
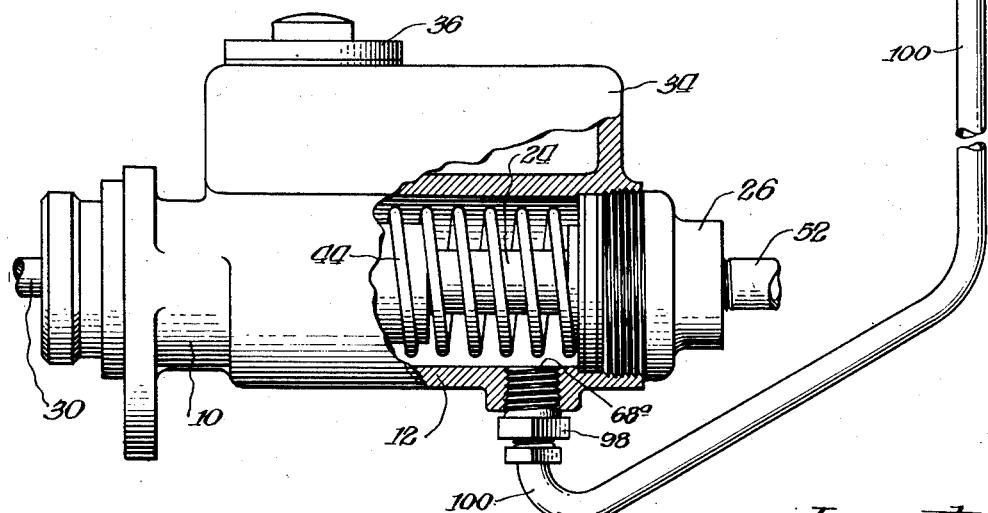

Patented May 12, 1953

2,637,977

UNITED STATES PATENT OFFICE 2,637,977

VALVE CONTROLLED BRAKE FLUID ACCUMULATOR FOR MASTER CYLINDERS

Alfred B. Seppmann, Mankato, Minn.

Application October 14, 1947, Serial No. 779,687

2 Claims. (Cl. 60—54.6)

1

This invention relates to a valve controlled brake fluid accumulator for master cylinders of compound type for producing a two-phase operating function. This general type of master cylinder is shown in my copending application Serial No. 691,251, filed August 17, 1946, now Patent No. 2,580,850. In that application, a relief valve assembly is provided for permitting return flow of fluid from the low pressure cylinder to the reservoir when high pressure operation is in effect. In some types of automobiles, and particularly in passenger cars, there is not enough room above the master cylinder to permit the use of a reservoir and relief valve thereover. Accordingly, an object of the present invention is to provide a valve controlled accumulator or chamber which takes the place of such relief valve and can be located at another position instead of above the master cylinder, the chamber being located in the lower portion of the master cylinder in one form of the invention and remotely located in another form thereof.

Another object is to provide a valve for the accumulator chamber which operates somewhat differently than a relief valve, the present chamber and valve being more in the nature of a valve controlled accumulator operable to receive the excess brake fluid from the low pressure cylinder when the high pressure piston goes into operation and to return it to the low pressure cylinder upon reverse operation.

Still another object is to provide an accumulator which is spring loaded to return brake fluid to the low pressure cylinder when "pumping" the master cylinder for additional braking action, the accumulator valve having means to permit additional fluid to enter from the reservoir if the accumulator itself does not have sufficient capacity to supply the needs of the low pressure cylinder during pumping action.

A further object is to provide a modified construction wherein the accumulator and its valve are independent of the reservoir and can thus be remotely located with respect to the master cylinder for the purpose of permitting a manual adjustment at the dash of the automobile for the spring pressure in the accumulator, thus making it possible to conveniently adjust the change-over pressure point from low pressure to high pressure braking operation at the will of the driver.

With these and other objects in view, my invention consists in the construction, arrangement and combination of the various parts of my accumulator and its control valve whereby

2 the objects contemplated are attained, as hereinafter more fully set forth, pointed out in my claims and illustrated in the accompanying drawings, wherein:

Figure 3 is a similar sectional view showing one step in the pumping operation and the position of the parts during such step, and Figure 4 is a partial sectional view of a master cylinder with a remote accumulator connected therewith in place of the type of accumulator disclosed in Figures 1, 2 and 3.

Figure 1:
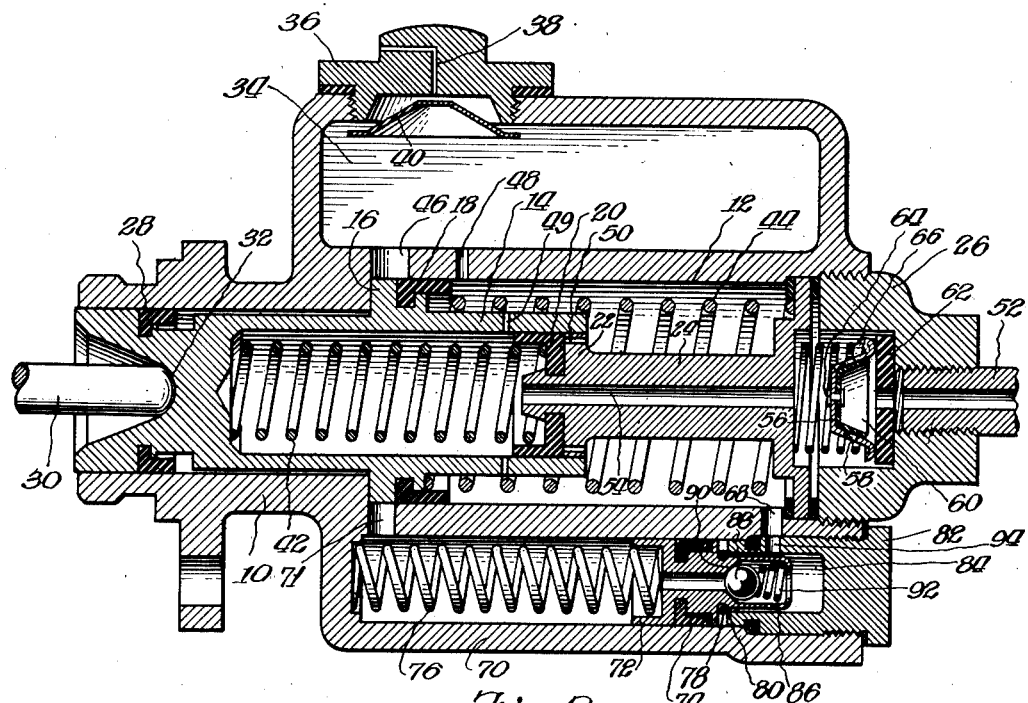
Figure 1 is a vertical sectional view through a master cylinder with my improved valve controlled chamber or accumulator applied thereto and showing the parts in their normal position or at rest.

On the accompanying drawings, I have used the reference numeral 10 to indicate a guide cylinder, 12 a low pressure cylinder, and 14 a high pressure cylinder. The low pressure piston in the low pressure cylinder 12 consists of a flange 16 around the high pressure cylinder 14 against which a cup leather 18 is seated. The high pressure piston comprises a rubber or neoprene sealing cup 20 against a flange 22 of a tubular post 24. The post 24 is mounted rigidly in the low pressure cylinder 12 by means of a closure fitting 26.

A high pressure cylinder 14 is sealed in relation to the guide cylinder 10 by means of a sealing cup 28. An operating stem 30 co-acts with a seat 32 of the high pressure cylinder 14 to operate the brakes, the stem 30 being of course connected with the brake pedal in the usual manner.

A reservoir 34 surmounts the low pressure cylinder 12 to contain brake fluid which has not been illustrated on the drawing in order to avoid confusion of detail. A closure plug 36 is provided for the reservoir 34. It is suitably vented at 38 and provided with a baffle plate 40 to prevent undesirable expulsion of brake fluid from the reservoir and yet permit atmospheric pressure equalization.

The high pressure cylinder 14 is constrained toward the left to the position shown in Figure 1 by springs 42 and 44. The upper wall of the low pressure cylinder 12 is provided with ports 46 and 48 and the flange 22 is provided with ports 50, the purpose of which will hereinafter appear. An outlet pipe 52 is connected with the closure fitting 26 and extends to the brake system.

Between an outlet passageway 54 in the stem 24 and the pipe 52 is a retarding valve comprising a cup member 56 perforated at 58, a rubber-like cup 60 and a sealing washer 62. The cups 56 and 60 are retained assembled by means of a rivet 64 and a spring 66 is provided to normally seat the periphery of the cup 60 against the washer 62.

The foregoing elements are similar to the master cylinder already disclosed in my copending application above referred to. I will now describe the particular improvement described below and which constitutes the present invention.

The low pressure cylinder 12 is provided with a port 68 in its lower wall. An elongated boss is formed on the lower portion of the reservoir 34 to provide an accumulator cylinder 70. The cylinder 70 communicates with the reservoir 34 by way of a port 71 to the cylinder 12 and through this cylinder and the port 46 to the reservoir. Within the cylinder 70 a piston 72 is slidably mounted and is sealed in relation to the cylinder by a sealing cup 74. A spring 76 normally holds the piston in the position of Figure 1 with a sealing ring 78 of the piston against a seat 80 that is somewhat smaller in area than the cylinder 70 for a purpose which will hereinafter appear.

The right-hand end of the cylinder 70 is closed by means of a closure plug 82 which has a cavity 84 to receive a projection 86 of the piston 72. Within the projection 86 a ball 88 is seated against a seat 90 by a spring 92. Communication is provided between the cavity 84 and the port 68 by means of a passageway 94.

In Figure 4 I show a modified construction wherein the cylinder 70 is replaced by a cylinder 70a which may be mounted on the dash 96 of the automobile by means of a flange 95 instead of being formed integral with the body of the master cylinder. The passageway 68a is threaded to receive a fitting 98 with which a tube 100 is connected. The tube in turn is connected by a fitting 102 with a closure plug 82a for the cylinder 70a. The piston 72a in this form of invention has a resilient disc 78a corresponding to the sealing ring 78 of Figure 1 and it seats against a seat 80a of the closure plug 82a. Other parts corresponding with Figure 1 bear similar reference numerals with the addition of a.

The spring 76a determines the pressure at which the disc 78a is unseated from the seat 80a. In this form of the invention, the spring is made adjustable by means of a screw threaded follower 104, having a slot 108 for a screw driver or similar suitable tool to be used for adjusting the tension of the spring. A vent 106 to atmosphere is provided to permit free movement of the piston 72a within the cylinder 70a.

Figure 2:
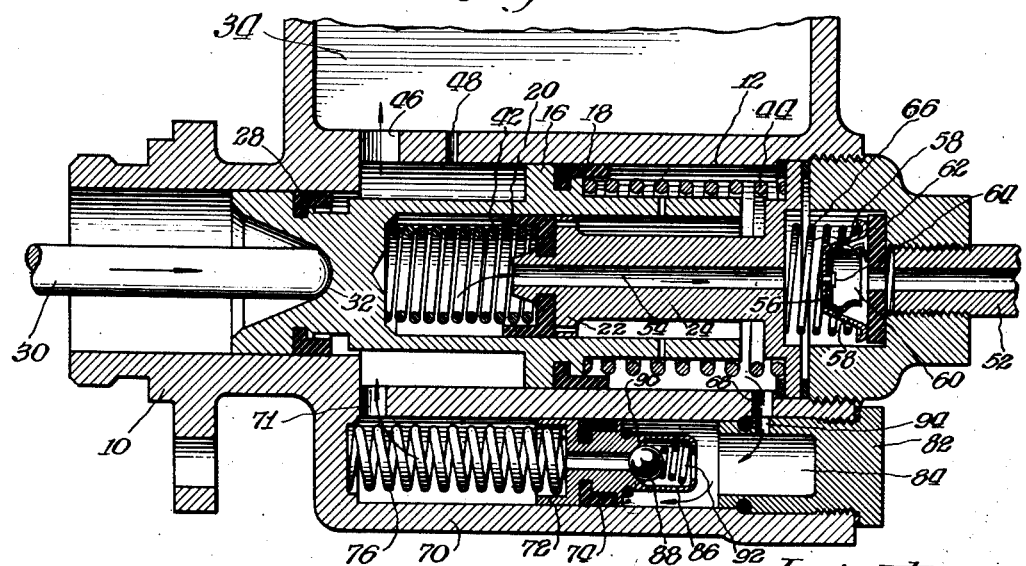
Figure 2 is a similar sectional view showing the brakes partially applied and operating at high pressure.

In the form of my invention shown in Figure 4, the chamber is strictly of the accumulator type without possibility of receiving additional oil from the reservoir as through the valve 88 of Figures 1, 2 and 3. Proportionally, the cylinder 70a is larger than the cylinder 70 so that it has more capacity to receive brake fluid.

*Practical operation*

In the operation of my master cylinder and the valve controlled accumulator chamber therefor disclosed in this specification, the initial braking action results in the high pressure piston 14 moving forwardly over the cup 20 and carrying the cup 18 with it. After the cup 18 passes the port 48, brake fluid will be trapped in the low pressure cylinder 12 ahead of the cup 18 and will be displaced through the ports 50 causing the cup 20 to bend away from the wall of the high pressure cylinder 14 as in Figure 3 to permit this fluid to inter the high pressure cylinder and pass through the passageway 54 and the retarding valve. The cup 60 of the retarding valve will bend in the manner illustrated in Figure 2 during the low pressure operation just described. Low pressure is had because of the low pressure piston displacing fluid into the high pressure cylinder and the high pressure piston also displacing fluid therefrom so that large volume displacement and thus quick action to take up slack in the brake system is had.

As soon as the brakes are applied, however, pressure will be built up in the master cylinder, and when that pressure exceeds the setting of the spring 76 as applied on the area of the sealing ring 78 where it is seated against the seat 80, it will move the piston 72 toward the left, thus unseating the sealing ring from the seat 80 whereupon the fluid pressure acts on the larger area of the cup 74. This results in relieving the built-up pressure in the low pressure cylinder because the movement of the piston 72 is opposed only by the spring 76 and the cylinder 70 receives the fluid that is further displaced from the low pressure cylinder by receiving and thus accumulating it. The relief of pressure in the low pressure cylinder permits the cup 20 to properly seat in the high pressure cylinder 14 and thereafter the brake fluid displaced from the high pressure cylinder through the passageway 54 is displaced at high pressure.

Whenever the brake pedal is released, the springs 42 and 44 return the high pressure cylinder 14 to the initial position of Figure 1, and during such return the spring 76 returns the piston 72 to its initial position.

A dual action master cylinder of the type disclosed in my copending application is capable of being "pumped." If the first stroke of the brake pedal does not fully apply the brakes and additional braking action is desired, the brake pedal can be let up momentarily and additional fluid will enter the master cylinder for this purpose. Likewise, in the present invention, any let-up on the brake pedal will result in the spring 76 displacing the fluid ahead of the piston 72 back through the ports 94 and 68 and from the low pressure cylinder into the high pressure cylinder by passage through the ports 50 and around the edge of the cup 20 as shown in Figure 3. If the fluid thus returning from the cylinder 70 is not sufficient to supply the demand, additional fluid will flow from the reservoir through the ports 46 and 71 and then through the valve seat 90, opening the ball valve 88 against the pressure of the spring 92 which is considerably weaker than the return springs 42 and 44. Thus, I have provided for additional fluid from the reservoir through the port 71 whereas during normal nonpumping operation, the port 71 serves as a breather for the space in the cylinder 70 behind the piston 72.

With the construction shown in Figure 4, the operation is substantially the same as described in connection with Figures 1, 2 and 3 except that there is no additional supply of fluid from the reservoir during the pumping action. Ordinarily, however, the fluid that enters the accumulator after the high pressure operation comes into effect is sufficient to supply the needs during a pumping operation, and the cylinder $70a$ has been made relatively larger so as to better take care of the needs of the master cylinder. Also, some adjustment is possible as to the amount of fluid entering the accumulator of Figure 4 since a reduction in tension of the spring $76a$ permits the high pressure operation to come into effect at a lower pressure and that results in greater displacement of fluid from between the high pressure piston and the low pressure piston during high pressure operation.

When the parts return to the position in Figure 1, the port 48 in the low pressure cylinder 12 and a similar port 49 in the high pressure cylinder 14 permit equalization of pressures within the cylinders in relation to the reservoir which of course is at atmospheric pressure by reason of the vent 38.

Having described my valve controlled chamber, it will be obvious that I have provided an accumulator that takes the place of the usual relief valve and performs functions equivalent thereto. It can be located below the master cylinder where it would be impossible to install a relief valve so that it would operate properly or may be mounted remotely in relation to the master cylinder as disclosed in Figure 4. The parts are simple to construct and reliable in operation, and all operating functions are performed in a simple manner during both braking and pumping operations of the brake system.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In an accumulator for a dual acting master cylinder having high and low pressure cylinders and a reservoir, an accumulator cylinder, a seat therein, an accumulator piston seated against said seat by spring pressure and capable of accumulating and retaining brake fluid entering said accumulator cylinder through said seat in all positions relative to said cylinder after said accumulator piston is unseated from said seat, the end of said accumulator cylinder adjacent said seat being in communication with that portion of the low pressure cylinder which is on the discharge side of the low pressure piston therein and the spring end thereof being in communication with the reservoir, and a valve of the check type carried by said accumulator piston and opening toward the low pressure cylinder for permitting flow of brake fluid from the reservoir through said accumulator on the discharge side of the low pressure piston therein to said master cylinder during a pumping operation.

2. In a valve controlled accumulator for a dual acting master cylinder having high and low pressure cylinders, an accumulator cylinder, a seat therein, an accumulator piston seated against said seat by spring pressure, the end of said accumulator cylinder adjacent said seat being in communication with the low pressure cylinder at a point ahead of the low pressure piston therein and the spring end thereof being in communication with said low pressure cylinder behind the low pressure piston therein, and a valve of the check type carried by said accumulator piston and opening toward the low pressure cylinder for permitting flow of brake fluid from the low pressure cylinder back of its piston to the low pressure cylinder ahead of its piston during a pumping operation of the brake system, said accumulator cylinder being imperforate between said seat and said piston in all unseated positions thereof to retain the brake fluid that enters said accumulator cylinder from the low cylinder through said seat.

ALFRED B. SEPPMANN.

References Cited in the file of this patent

UNITED STATES PATENTS

| Number | Name | Date |
|---|---|---|
| 763,833 | Albree | June 28, 1904 |
| 1,443,219 | Frock | Jan. 23, 1923 |
| 1,958,722 | Sinclair et al. | May 15, 1934 |
| 2,104,735 | Carroll et al. | Jan. 11, 1938 |
| 2,166,742 | Lambert | July 18, 1939 |
| 2,255,359 | Lepersonne | Sept. 9, 1941 |

FOREIGN PATENTS

| Number | Country | Date |
|---|---|---|
| 424,676 | Great Britain | Feb. 26, 1935 |